United States Patent [19]

Stewart

[11] Patent Number: 4,648,569
[45] Date of Patent: Mar. 10, 1987

[54] AIRPLANE AUTOMATIC CONTROL FORCE TRIMMING DEVICE FOR ASYMMETRIC ENGINE FAILURES

[75] Inventor: Eric C. Stewart, Yorktown, Va.

[73] Assignee: The United States of America as represented by the Administrator of the National Aeronautics and Space Administration, Washington, D.C.

[21] Appl. No.: 790,556

[22] Filed: Oct. 23, 1985

[51] Int. Cl.⁴ ............................................. B64C 13/00
[52] U.S. Cl. ................................... 244/76 R; 340/967
[58] Field of Search ............... 244/76 R, 178, 90 B, 244/184, 75 R, 82, 76 A; 340/963, 967, 966, 970

[56] References Cited

U.S. PATENT DOCUMENTS

| | | | |
|---|---|---|---|
| 2,597,020 | 5/1952 | Nissen | 244/76 R |
| 2,954,944 | 10/1960 | Huet | 244/76 R |
| 3,023,985 | 3/1962 | Hong et al. | 244/178 |
| 3,045,954 | 7/1962 | Schmidt et al. | 244/76 R |
| 3,160,367 | 12/1964 | Lecarme | 244/76 R |
| 3,193,219 | 7/1965 | Parker et al. | 244/178 |
| 4,143,839 | 3/1979 | Antonov et al. | 244/76 R |
| 4,538,777 | 9/1985 | Hall | 244/1 R |
| 4,546,353 | 10/1985 | Stockton | 340/963 |

FOREIGN PATENT DOCUMENTS

| | | | |
|---|---|---|---|
| 2787747 | 4/1950 | United Kingdom | 244/76 A |
| 2079707 | 7/1981 | United Kingdom . | |

Primary Examiner—Galen Barefoot
Assistant Examiner—Lynn M. Fiorito
Attorney, Agent, or Firm—George F. Helfrich; John R. Manning; Robert D. Marchant

[57] ABSTRACT

The difference in dynamic pressure in the propeller slipstreams as measured by sensors 20 and 20a is divided by the freestream dynamic pressure generating a quantity proportional to the differential thrust coefficient. This quantity is used to command an electric trim motor 26 to change the position of trim tab 14 thereby retrimming the airplane to the new asymmetric power condition. The change in position of the trim tab produced by the electric trim motor is summed with the pilot's input to produce the actual trim tab position.

8 Claims, 2 Drawing Figures

AIRPLANE AUTOMATIC CONTROL FORCE TRIMMING DEVICE FOR ASYMMETRIC ENGINE FAILURES

ORIGIN OF THE INVENTION

The invention described herein was made by an employee of the United States Government and may be manufactured and used by the Government for governmental purposes without the payment of any royalties thereon or therefor.

BACKGROUND OF THE INVENTION

This invention relates generally to automatic control systems for airplanes and in particular to an automatic control force trimming device for asymmetric engine failures.

When an engine fails on a multi-engine airplane, large asymmetric moments are generated. The asymmetric moments will cause uncontrolled flight and a crash unless corrective action is taken very quickly. Immediately after an engine failure corrective action requires rolling and yawing the airplane (with the wheel and rudder controls respectively) to counter the asymmetric moments. At the same time, airspeed must be maintained approximately equal to the best-rate-of-climb airspeed in order to keep from descending. However, during this time the control forces required of the pilot in the cockpit are extremely large. In order to relieve the majority of these forces and make the plane controllable, the airplane's secondary control surfaces or trim tabs must be retrimmed to the new asymmetric power condition.

In the past, on light, twin-engine propeller driven airplanes, the pilot has had to take all the corrective action himself, including retrimming the airplane. The dismal accident record of this class of airplanes after an engine failure leads to the conclusion that a device which lowers the pilot workload would be very beneficial. Conventional automatic control systems such as those in larger transports and other airplanes were never extensively used because they were too costly for light airplanes. In addition, they also required multiple sensors such as rate gyros, attitude gyros, linear accelerometers, and angle-of-sideslip vanes. Such systems would essentially be a "fly-by-wire" control system which would meet with intense pilot-owner and regulatory resistance because of the unique maintenance and reliability considerations of general aviation airplanes.

Thus, it is an object of the present invention to provide an automatic control system that would reduce the large control forces required of the pilot during an engine failure on a light, twin-engine propeller-driven airplane.

It is a further object of the present invention to provide a low cost automatic system to reduce the pilot workload in the event of an engine failure.

Another object of the present invention is to provide an automatic control system that is not fly-by-wire and allows for the pilot's direct control of the primary control surfaces.

A still further object of the present invention is to provide an automatic control system that reduces the large control force in the event of an engine failure that is simple and which has low maintenance requirements.

Other objects and advantages of the present invention will be readily apparent from the following description and drawings which illustrate a preferred embodiment of the present invention.

SUMMARY OF THE INVENTION

When an engine fails on a twin-engine propeller-driven airplane, a difference in dynamic pressure in the propeller slipstreams develops and is measured by sensors mounted in each propeller slipstream. When the difference in dynamic pressure is divided by the freestream dynamic pressure, a quantity theoretically proportional to the differential thrust coefficient is produced. This quantity is multiplied by a gain to produce the change in trim tab position required to retrim the airplane at the new asymmetric power condition. The electric trim motor changes the position of the trim tab which is summed, mechanically or otherwise, with the pilot's input to produce the actual trim tab position. The system is open-loop in that there is no feedback of the actual trim condition. The system is closed-loop in that the change in trim tab position is a function of airplane airspeed and power on the good engine. The system will aid the pilot by reducing the control forces felt in the cockpit while the plane is in an asymmetric power mode. Operation will continue during extended post engine failure maneuvering as well as the more critical seconds immediately after an engine failure.

DETAILED DESCRIPTION OF THE PREFERRED EMBODIMENT

Figure 1:
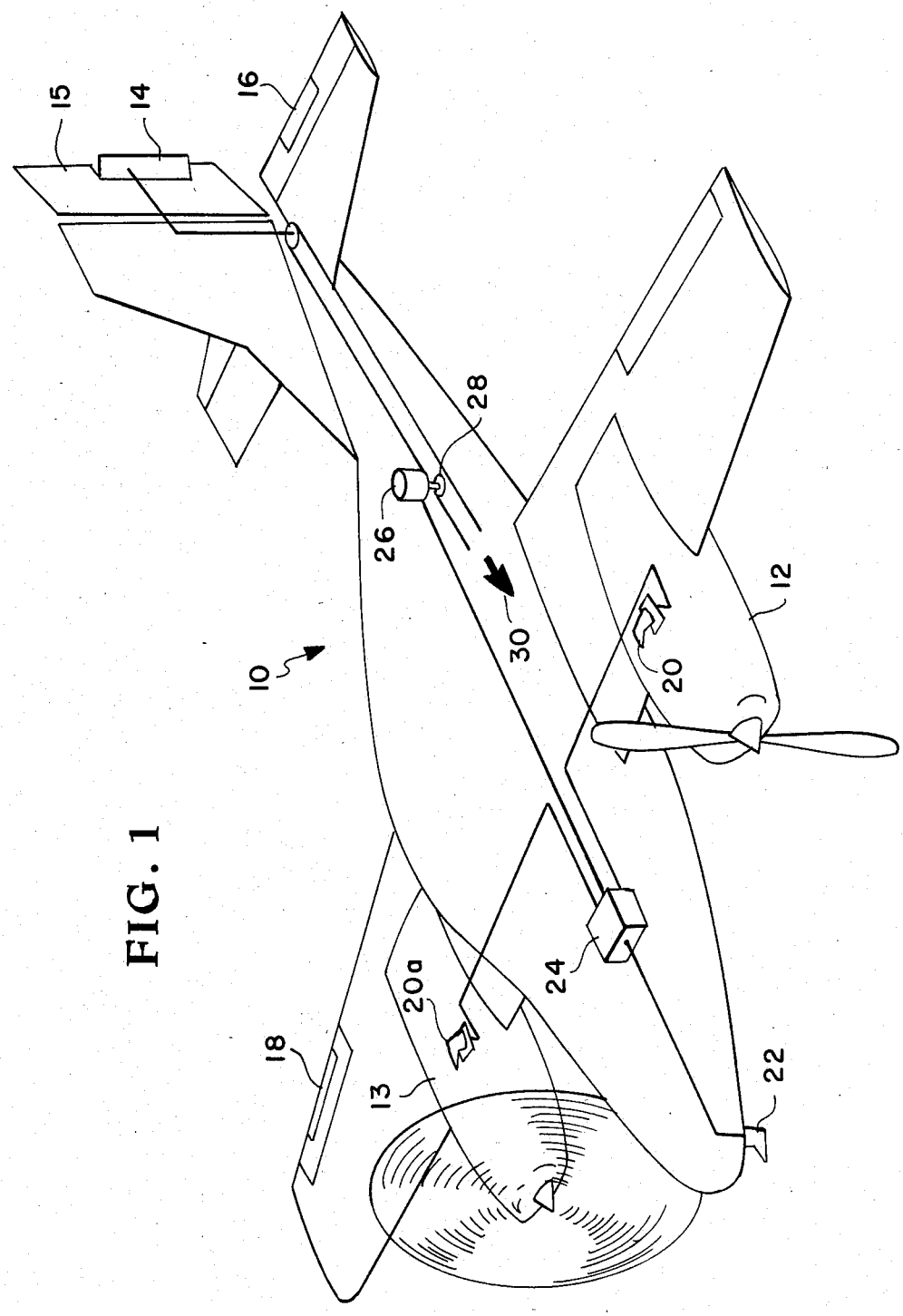
FIG. 1 is a schematic drawing of a twin-engine, propeller-driven airplane in an asymmetric power mode equipped with automatic control force trimming device according to the present invention.

Referring now more particularly to an embodiment of the invention selected for illustration in the drawings, FIG. 1 shows a schematic of a twin-engine, propeller-driven airplane designated generally by 10 with its left engine 12 failed. An automatic control force trimming device according to the present invention is installed on the airplane 10. The invention can control all of the secondary control surfaces or trim tabs on the airplane, that is, the rudder trim tab 14, elevator trim tab 16 and aileron trim tab 18. However, for ease of illustration, the system is shown connected to rudder trim tab 14 only.

The component parts of the system include two pressure sensors 20 and 20a placed in the left and right propeller slipstreams respectively. The sensors could be conventional pitot-static probes or possibly total pressure probes. Pitot-static probes, which measure dynamic pressure, are assumed to be used in the present discussion although total pressure probes may be better suited for some installations. A third pressure sensor 22 is shown at the nose of the plane to measure the freestream dynamic pressure. The third sensor would, in most installations, be the existing airspeed probe used for the pilot's conventional airspeed indicator. When engine 12 fails placing airplane 10 in an asymmetric power mode, signals produced by pressure sensors 20, 20a and 22 are fed into a computer 24 where a new asymmetric mode trim position is calculated. If the control surface deflection, hinge moments, etc., are linear, a simple amplifier can be used to command the trim tab deflections, otherwise, a micro-computer could be used to schedule the trim tab deflections. The new asymmetric mode trim position signal, calculated by computer 24, controls the electric trim motor 26 which in turn drives rudder trim tab 14 to the new asymmetric mode trim position. In addition to this automatic control, the device also allows the pilot to add his own trim control which is designated by the arrow 30 in FIG. 1. The pilot's trim tab position input is mechanically or otherwise summed with the device trim tab position input by a mechanical summer 28.

Figure 2:
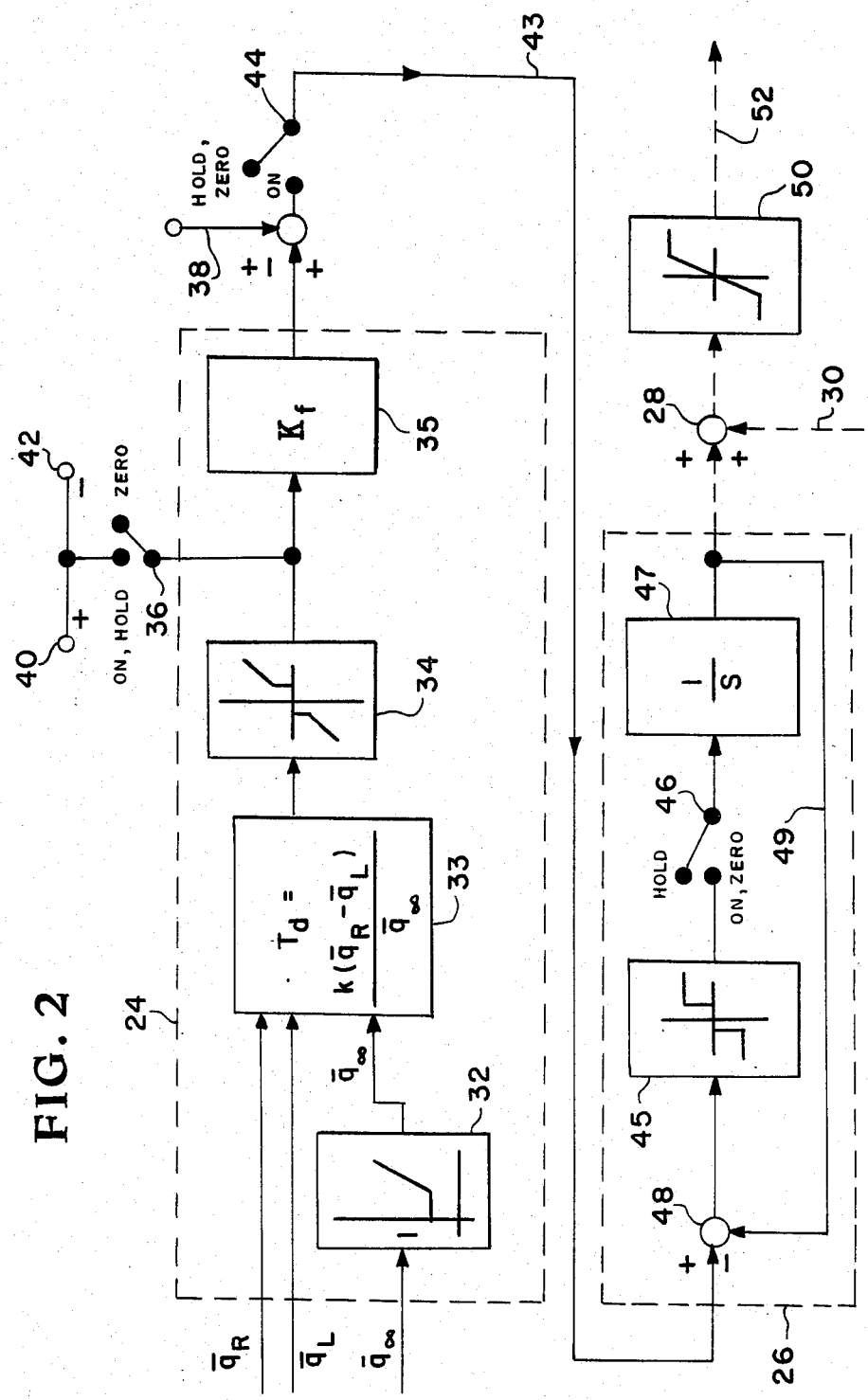
FIG. 2 is a block diagram of an airplane automatic control force trimming device for asymmetric engine failures according to the present invention.

In addition to retrimming the airplane automatically, two light indicators 40 and 42, shown in FIG. 2, are mounted in the left and right feathering control levers respectively. If left engine 12 fails, indicator 40 will light up on the left control lever indicating to the pilot that he should feather the propeller on the failed left engine. Likewise, if right engine 13 fails, indicator 42 will light up on the right control lever indicating to the pilot that he should feather the propeller on the failed right engine.

When engine 12 fails as shown in FIG. 1, large asymmetric moments are generated which in turn manifest themselves in the cockpit as large control forces required of the pilot to control the airplane. Ordinarily, the pilot must use the wheel and rudder controls in order to prevent the plane from rolling and yawing towards a crash situation. However, because the airplane is not trimmed to the new asymmetric power mode, the pilot must either fight the strong forces in the cockpit or retrim the airplane to reduce the forces, either of which must be done while the pilot is trying the maintain the speed and control of the airplane. The present device retrims the airplane automatically taking advantage of the "aerodynamic boost" available in the trim tabs to overcome the large hinge moments of the primary control surfaces. This aids the pilot immediately after an engine failure as well as during extended post-engine failure maneuvering. The device also permits the pilot to make manual trim tab position adjustments if he so desires.

The principle of attaining the new trim tab position is based upon the difference in slipstream dynamic pressure when the airplane is in the asymmetric power mode. The difference in slipstream pressure between sensors 20a and 20 is divided by the freestream dynamic pressure measured by sensor 22. The differential thrust coefficient used in the proposed system is given by:

$$T_d = \frac{k(\bar{q}_R - \bar{q}_L)}{\bar{q}_\infty}$$

where $\bar{q}_R$ is the dynamic pressure in the right engine slipstream, $\bar{q}_L$ is the dynamic pressure in the left engine slipstream, $\bar{q}_\infty$ is the dynamic pressure in the freestream and k is an empirical constant. The generalized control law for the change in trim tab position is $$\Delta\delta_{tab} = f(T_d) \qquad (2)$$

This law applies to the rudder, aileron and elevator trim tabs. The functional relationship is dependent on the combined thrust characteristics, the airplane's stability and control characteristics and the hinge moment characteristics. In practice the functional relationship may be a simple linear proportionality as shown in FIG. 2. The control law is "open-loop" in that there is no measurement of the trim tab-position or control force which is used to modify the commanded trim tab position. However, as the airplane changes airspeed or the thrust developed by one engine changes, the commanded trim tab position will change.

Referring to FIGS. 1 and 2, the operation of the present invention will be described assuming that left engine 12 has failed. A difference in the slipstream dynamic pressures $\bar{q}_R$ and $q_L$ develops as detected by sensors 20a and 20. This difference, positive for a left engine failure, is divided by the freestream dynamic pressure $\bar{q}_\infty$ yielding the differential thrust coefficient $T_d$ when the quantity $(\bar{q}_R - \bar{q}_L)/\bar{q}_\infty$ is multiplied by the experimental constant k as indicated by 33. Note that the detected freestream dynamic pressure signal $\bar{q}_\infty$ is sent through a limiter 32 to protect the quantity from being divided by zero if the plane is stopped on the ground with the system ON. A dead band filter 34 prevents slight pressure differences between the right and left slipstream from activating the system. The positive sign of $T_d$, when applied through switch 36, will light up indicator 40 on the left propeller feathering control lever in the cockpit when switch 36 is in the ON or hold position. One other position is available with switch 36. ZERO clears the device output to indicator lights 40 and 42. If right engine 13 had failed $T_d$ would be negative and indicator 42 would light.

The differential thrust coefficient $T_d$ is multiplied by a gain 35 to produce the trim tab position change signal required to retrim the airplane at the new asymmetric power condition. Gain 35 is the gain required to zero the force on rudder 15 using trim tab 14 and is a function of the type of airplane and its airspeed. For simulator testing purposes, gain 35 was a constant chosen for a particular airspeed equal to the best-rate-of-climb airspeed.

The trim tab position change signal is then summed with bias input 38 resulting in the change signal to be applied to a constant rate electric motor 26 when switch 44 is in the ON position. Bias input 38 is used to balance any asymmetries of the measured slipstream dynamic pressures at symmetric power conditions. In the HOLD position, the last change signal is maintained and the ZERO position clears the system of any change signal thereby allowing the pilot to remove the effect of the automatic control device at any time.

The change signal 43, when applied to electric trim motor 26, produces a change in position of trim tab 14. Motor 26 is a constant rate motor, indicated by 45, integrated over time, indicated by 47. The motor position feedback, indicated by 49, is subtracted from the change signal 43 at 48 thereby holding the trim position constant in response to the change signal 43. Once again, a switch 46 is available to the pilot for controlling the operation of motor 26. Motor 26 will respond to the change signal when switch 46 is in the ON position. The HOLD position will maintain the motor at its present output while the ZERO position serves to clear motor 26 of all output. Operation of switches 36, 44 and 46 is governed by one cockpit control thereby coordinating the HOLD and ZERO positions. Zeroing the system at switch 44 requires switch 46 to be closed in order to clear motor 26 of all output. Holding the system at switch 44 requires switch 46 to be open in order to hold motor 26 at its present output. The change in position of trim tab 14 produced by motor 26 is then summed with the pilot input 30 by mechanical summer 28 resulting in the actual trim tab position of trim tab 14 as indicated by arrow 52. The system input plus any pilot input 30 will move trim tab 14 within its physical limits as indicated by 50, to reduce the forces on rudder 15 when the airplane is in the asymmetric power condition.

The system is open-loop in that there is no feedback of the actual trim condition. If the airplane is out of trim when the engine fails, it will be out of trim after the engine failure even if the system works perfectly. However, it would prevent the trim from getting worse. The system is closed loop in that the change in trim tab position will be a function of airplane airspeed ($\bar{q}_\infty$) and power on the good engine. Thus, the system will aid the pilot during extended post-engine failure maneuvering as well as the more critical seconds immediately after an engine failure.

The device has several advantages over conventional engine-out control systems. First, it uses existing, "off-the-shelf", low-maintenance hardware which has been used for years in the general aviation field environment. It, therefore, eliminates the need for heavy, powerful hydraulic control systems and delicate sensors. Secondly, it eliminates complicated control laws in conventional engine-out control systems. It does this by recognizing and taking advantage of the physical relationship between slipstream dynamic pressure and the trim tab positions required to stabilize the airplane. Thirdly, it makes use of the "aerodynamic boost" available in trim tabs to overcome the large hinge moments of the primary control surfaces. This "aerodynamic boost" is what eliminates the requirement for heavy, hydraulic control systems. Finally, the device does not replace the pilot in the primary control surface control system as do fly-by-wire systems. That is, the pilot maintains direct control of the primary aerodynamic-control surfaces. The automatic engine-out trim system merely reduces the large control forces felt in the cockpit so that the pilot workload is reduced and he can maintain precise control of the airplane. With more precise control of the airplane the pilot will be better able to maximize the critical engine-out climb performance. The system may be designed to drive toward a zero sideslip case which will help maximize climb performance. Furthermore, the device will also be of great use to the pilot for landing the airplane with a failed engine. As power on the good engine is reduced for landing, the airplane will be placed in a new asymmetric power condition. Thus, the device retrims the airplane during this time and allows the pilot to concentrate on attitude, airspeed and altitude. The system could also be used to minimize/optimize control force changes with symmetric power changes or other airplane configuration change. In addition, it could also be integrated with conventional auto-pilot systems to provide a multi-function system.

The novelty of the present invention resides in automatically controlling trim tab deflection to reduce the control forces felt in the cockpit when an airplane is in the asymmetric power mode using the differential thrust coefficient. The differential thrust coefficient has been shown in wind-tunnel tests to be the primary determinant of the asymmetric moments on the airplane while use of the trim tab deflection to create aerodynamic boost eliminates the need for a hydraulic system.

What is claimed is:

1. A method of improving the controllability of twin-engine propeller-driven airplanes operating in an asymmetric power mode comprising:
    measuring the freestream dynamic pressure and the propeller slipstream dynamic pressures;
    generating a quantity proportional to the differential thrust coefficient including dividing the difference between said propeller slipstream dynamic pressures by said freestream dynamic pressure; and
    adjusting the secondary control surfaces on the airplane in response to the quantity proportional to the differential thrust coefficient to help reduce the large control force felt in the cockpit due to the asymmetric power condition wherein the reduced control forces improve the controllability of the airplane.

2. The method of claim 1 wherein adjusting the secondary control surfaces includes a summer for adding pilot adjustment to the system adjustment.

3. An automatic trimming device to help reduce the large asymmetric control forces felt in the cockpit of a twin-engine propeller-driven airplane operating in an asymmetric power mode comprising:
    a means for measuring the freestream dynamic pressure and the propeller slipstream dynamic pressures;
    a means for generating a quantity proportional to the differential thrust coefficient including dividing the difference between said propeller slipstream dynamic pressures by said freestream dynamic pressure; and
    a means for adjusting the trim tab position on each of the primary control surfaces in response to said quantities to help reduce said large control forces.

4. An automatic trimming device as in claim 3 wherein said means for producing quantities proportional to the dynamic pressure comprises dynamic pressure sensors.

5. An automatic trimming device as in claim 3 wherein said means for adjusting the trim tab position includes a summer for adding pilot adjustment to the system adjustment.

6. An automatic trimming device as in claim 5 wherein said means for generating said quantity proportional to the differential coefficient comprises an amplifier or micro-computer.

7. An automatic trimming device as in claim 5 wherein said means for automatically adjusting comprises an electric trim motor connected to said trim tabs.

8. An automatic trimming device as in claim 5 wherein said means for summing is a mechanical summer.

* * * * *